July 29, 1958
C. R. BELL
2,845,238
REMOTE CONTROL DEVICE
Filed Dec. 10, 1953
FIG. 1
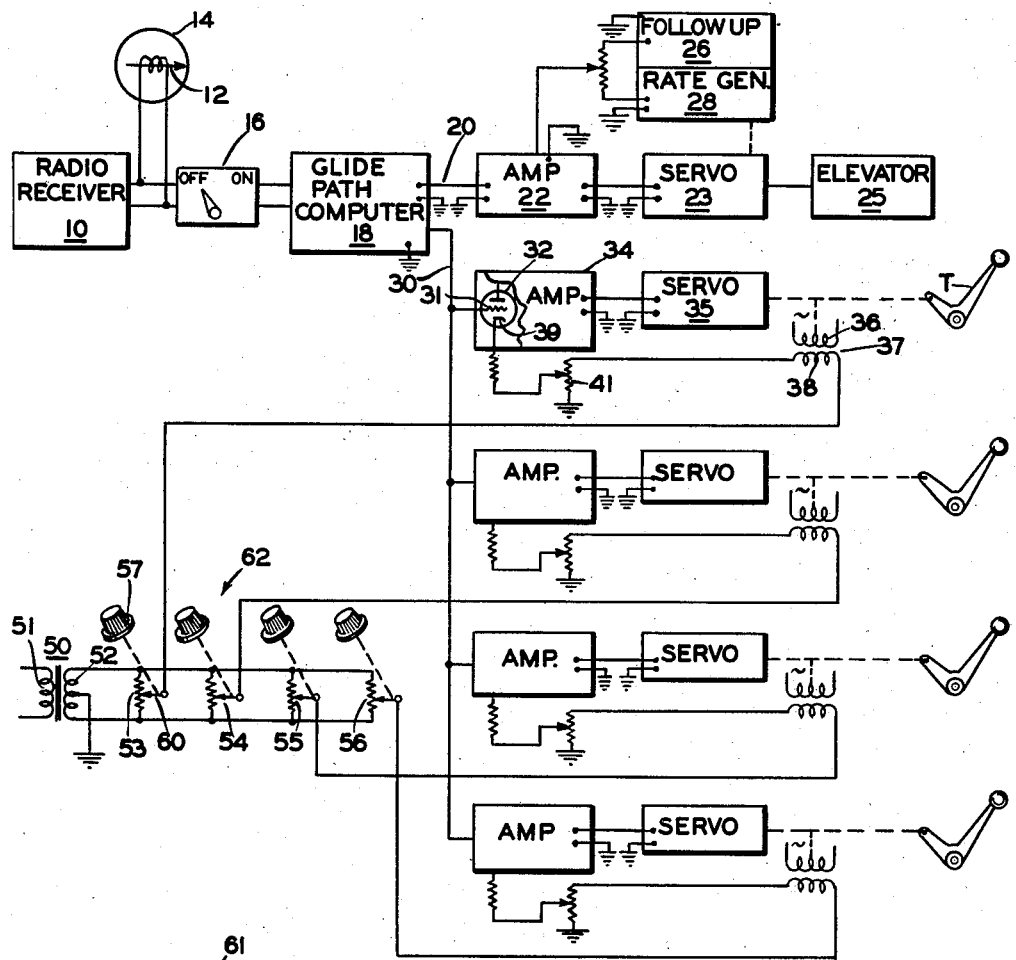
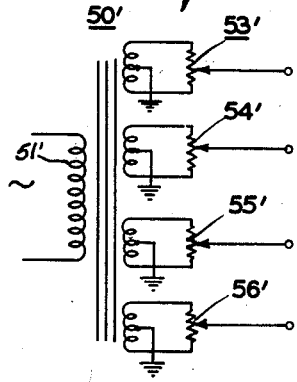
FIG. 2
INVENTOR.
CHARLES R. BELL
BY
Oscar B Brumback
ATTORNEY United States Patent Office 2,845,238
Patented July 29, 1958

2,845,238
REMOTE CONTROL DEVICE

Charles R. Bell, Bergenfield, N. J., assignor to Bendix Aviation Corporation, Teterboro, N. J., a corporation of Delaware Application December 10, 1953, Serial No. 397,358

5 Claims. (Cl. 244—77)

This invention relates generally to control systems and more particularly to systems for controlling the position of an object from a remote location.

The intersection of two overlapping field patterns radiated from a glide path transmitter located at the landing strip forms the vertical flight path or glide path for the instrument landing of aircraft. Both pitch attitude and engine power must be coordinated in following this glide path to keep the airspeed constant. The reason for this is that a change in pitch attitude without a corresponding change in engine power may produce a dangerously high speed or a stall. Either condition is hazardous when the craft is approaching the ground. The pitch attitude is controlled by the elevators and the engine power by the throttles.

In conventional instrument landing systems, a radio on the craft receives the beam patterns and develops an output from which a computer produces control effects for the elevator and throttle servomotors of the craft. The control effect sent to the elevator and throttle servomotors is so proportioned that the ratio of elevator to throttle displacement is fixed at some optimum value.

Normally, each engine of the craft has a throttle positioning servomotor connected directly to the carburetor arm or butterfly valve. In coordinating the thrust of the engines with changes in pitch attitude, the throttles are moved in either direction from a predetermined setting called a throttle null position. This is the position which gives a desired rate of descent when the aircraft is maintained on the glide path.

So that the displacement of the throttle will correspond with the control effect, a follow-up device measures the position of throttle relative to a predetermined position and develops a corresponding signal. Now, the signal from the computer is zero when the craft is on the glide path. Therefore, it is necessary that the null position of the follow-up correspond to the predetermined setting of the throtttles, i. e., the throttle null position. Normally, the follow-up signal developing device is in the servomotor housing.

To set a predetermined null position, the follow-up is adjusted by moving the stator relative to the rotor. In many cases, these adjustments must be made with the engines running. Since the follow-up signal developing device is usually in the servomotor housing, this creates a hazardous condition for the operator who is on the wing making the adjustments. Even under these conditions, the proper adjustments are arrived at by trial and error inasmuch as the operation of the engine when the aircraft is on the ground may differ markedly from the operation of the engine when the aircraft is in the air and coming in for a landing.

An object of the present invention, therefore, is to provide a novel apparatus for making any necessary alterations in the position of the throttles of an aircraft from the pilot's compartment while the aircraft is in flight.

Another object is to provide a novel arrangement for changing the normal position of a throttle of an engine in a control system.

A further object is to provide a novel arrangement for changing the reference position of an object which is movable with respect to the reference position by another controlling object.

In the novel arrangement applicable to instrument flight systems for aircraft as contemplated by the present invention, a control signal for maintaining a craft on a flight path actuates a power controller by way of one circuit in opposition to a signal in an isolated circuit developed by the displacement of the power controller from a normal position and a signal developed for changing the normal position.

The foregoing and other objects and advantages of the invention will appear more fully hereinafter from a consideration of the detailed description which follows, taken together with the accompanying drawing wherein several embodiments of the invention are illustrated by way of example. It is to be expressly understood, however, that the drawing is for the purpose of illustration and description only, and is not intended as a definition of the limits of the invention.

In the single sheet of drawing,

Fig. 1 illustrates the novel throttle control arrangement as being incorporated in the instrument landing system of an aircraft; and Fig. 2 illustrates another embodiment of the invention.

Turning now to the drawing, the novel throttle control arrangement of the present invention may be incorporated in an instrument landing system of the type described in U. S. Patent No. 2,592,173, issued April 8, 1952, to P. A. Noxon. A radio receiver 10 in a known manner receives the glide path signals and develops corresponding direct currents which are placed in opposition so that their difference measures the relative values of the two beams. This difference is used to move a pointer 12 so that the displacement of the pointer above or below its center position in dial 14 indicates the position of the aircraft relative to the glide path. This current difference is also applied to a switch 16, which, when in the "on" position, applies the direct current to a glide path computer 18 such as that described more fully in the aforementioned patent. Computer 18 develops no output as long as the craft is on the beam. When the craft is displaced from the beam, computer 18 develops a signal output corresponding to the magnitude of the displacement of the craft and its time duration. The response of the automatic pilot system; when this output is applied to the elevator and throttle control channels, produces a controlled rate of descent of the craft along the glide path.

Considering now the elevator control channel, a displacement of the aircraft above or below the glide path results in computer 18 developing a signal which is applied by way of a lead 20 to the input of a conventional servoamplifier 22. The output of amplifier 22 operates a servomotor 23 until the displacement of the elevator surface 25 is such that an equal and opposite signal is developed at follow-up device 26. The net input to amplifier 22 at this time is zero, and servomotor 23 stops with the elevator surface displaced. Rate generator 28 develops a velocity signal corresponding to the rate of operation of servomotor 23 to give a dead beat operation.

Turning now to the throttle position control arrangement of the present invention, the signal from computer 18 is applied by way of a lead 30 to the throttle servo-amplifiers. Each throttle servomotor is operated by a separate amplifier and the amplifiers may be identical. Since these amplifiers may be conventional, only a section of one will be discussed in detail. Thus, lead 30 conducts the signal from computer 18 to the grid 31 of a tube 32 in amplifier 34. The output of amplifier 34 drives servomotor 35 which displaces the rotor winding 36 of a follow-up device 37 relative to its stator winding 38 to develop a signal corresponding in amplitude and phase to the extent and direction of displacement of the throttle T from its predetermined position. This signal is applied to the cathode 39 of an amplifier tube 32 through a voltage divider 41.

The interacting computer and follow-up signal circuits are effective to control the servo for the throttle T through the tube 32 of the foregoing throttle amplifier arrangement. When equal signal voltages appear at grid 31 and cathode 39, no signal differential exists between the grid and cathode. Thus, no servo action is called for. This is the null or normal position of the servosystem.

Should the aircraft be displaced from the beam, computer 18 develops a corresponding signal which is applied by way of lead 30 to grid 31. A difference now exists between the grid and cathode voltages, and amplifier 34 develops an output for operating the throttle servomotor 35. This operation continues until the displacement of rotor winding 36 relative to stator winding 38 is such that the follow-up signal applied to cathode 39 is equal to the computer signal applied to grid 31.

Difficulty has been experienced heretofore in adjusting the null position of follow-up device 37 to correspond to the desired position of the throttle. In many cases, it has been necessary for a mechanic to crawl along the wing of the aircraft to the nacelle while the engines are running and adjust the position of the stator winding of the follow-up device relative to the rotor winding. The present invention overcomes this hazard since the normal position of the throttle of each engine may be adjusted individually from the pilot's compartment while the aircraft is in flight.

So that the normal position of the throttle may be adjusted, a transformer 50 having a primary winding 51 energized from the same source as the signal channel of the amplifier and a center tapped secondary winding 52 is provided. Connected across secondary winding 52 are four potentiometers 53, 54, 55 and 56, each having a wiper connected in series with the stator winding of a follow-up device in a respective throttle control channel. Each wiper has a manually adjustable member such as member 57 for positioning the wiper on its potentiometer.

As long as a wiper is in a centered position relative to its potentiometer, a balanced network is formed across each potentiometer so no output voltage appears at the wiper. However, movement of the wiper in either direction from this central position develops at the wiper a signal whose amplitude and phase depends upon the extent and direction of displacement from center position.

Inasmuch as the control channel for each throttle is identical, for purposes of brevity, only one will be discussed. Should follow-up device 37 be in a null position and no signal be supplied to tube 32 from computer 18, the channel is balanced and no output develops at amplifier 34. However, should wiper 60, for example, be displaced, a signal appears at cathode 39. This causes an amplifier output which drives the throttle servomotor 35 until rotor winding 36 is displaced relative to stator winding 38 to develop a signal equal and opposite to the signal from wiper 60. At this time the net input to tube 32 is zero and the servomotor stops.

The control system is again in a balanced condition and the throttle is at a new position. This new position becomes the normal position and can be adjusted for each engine individually while the craft is in flight to give optimum performance of the engines.

After a normal throttle setting has been established, a displacement of the craft, for example, upwardly from the glide path, will result in computer 18 developing a signal which actuates servomotor 23 to move the elevator 25 downwardly to place the craft in a nose-down position and, at the same time, develops a signal which actuates the throttle servomotors 35 to retard the throttle settings. In the latter operation, the signal from computer 18 causes the balanced condition existing at the inputs of tube 32 to be changed. The resulting output from amplifier 34 drives the throttle servos until the throttle is moved to such a position that the signal from the follow-up device and wiper is equal and opposite to the signal from computer 18.

As the aircraft moves toward the beam, the throttle and elevator are moved coordinately to maneuver the craft into line with the beam. Any change in airspeed not compensated for by a corresponding pitch attitude change, however, would cause the aircraft to deviate from the beam, and this displacement would again result in the throttle and elevator positions being coordinated to return the craft to the beam at a constant airspeed.

A possibility exists in the foregoing arrangement that, due to a short, an interaction may occur between the throttle channels. The embodiment shown in Figure 2 obviates this possibility by isolating each channel.

Turning to Figure 2, unit 61 of Figure 2 may be used to replace unit 62 in the combination of Figure 1. In unit 61, the power transformer 50' is provided with an energized primary winding 51' and four center tapped secondary windings, one for each engine. A potentiometer 53', 54', 55' or 56' is placed across each secondary winding and connected in series with the follow-up device of a respective throttle control channel. Since each secondary winding is isolated from the other, no interaction takes place between the control channels.

The foregoing has described a novel instrument landing system for coordinating the elevator and throttle positions so that an aircraft will descend along a predetermined path at a desired airspeed. In the novel system, the throttle positions of the individual engines may be changed from the pilot's compartment even though the craft is in flight and the servomotors, themselves, remotely located on the nacelle of the craft. This permits an initial setting of the engines to give optimum operating conditions, or a change in the initial setting as operating conditions warrant.

Although only several embodiments of the invention have been illustrated and described in detail, it is to be expressly understood, that the invention is not limited thereto. Various changes can be made in the design and arrangement of the parts without departing from the spirit and scope of the invention as the same will now be understood by those skilled in the art.

I claim:

1. In an automatic control system for an aircraft, first means for controlling the pitch attitude of the craft, second means for controlling the power developed by said craft, third means responsive to change in position of said craft from a predetermined position for developing a control signal coordinately controlling said first and second means, fourth means for developing a follow up signal corresponding to the extent of operation of said second means, said control signal and follow up signal normally being connected in opposed relation to provide a resultant signal for said second means, and means for developing an adjusting signal for opposing said follow up signal for controlling said second means said adjusting means serially connected to said fourth means and operative independently of said third means while said third means is operative to supply signals to said second means.

2. A control system comprising, power means operable in response to a control effect for actuating an object, a pair of circuits, one of said circuits including means operable in response to a condition for developing a control effect, the other circuit including means responsive to actuation of an object from a datum for developing a control effect and means for developing a control effect for changing said datum, electronic valve means operatively controlled by said circuits and effective for developing a control effect corresponding to the difference in the control effects of said circuits, and means for connecting said circuits to provide a resultant control effect for said power means.

3. In an automatic control system for a craft, power means for positioning the throttle of said craft, control means for said power means including thermionic means having anode, cathode, and control grid elements, said anode element being operatively connected to said power means, first means for developing a control effect corresponding to a change in condition of said craft connected to said grid element, and second means for developing a control effect corresponding to the position of the throttle, and third means for developing a constant control effect connected through said second means to said cathode element, whereby said first means control said craft by operating said power means so as to displace said throttle from a predetermined position, and said second and third means cooperate to establish a new predetermined position.

4. In an automatic control system for a variable attitude aircraft, power means for positioning a throttle of said craft with respect to a predetermined position, control means for said power means including a control loop responsive to the pitch attitude of the aircraft and another control loop responsive to the position of said throttle, said control loops so arranged as to normally balance each other when said throttle is at said predetermined position, and an amplifier, said amplifier having anode, cathode and control grid electrodes, means for connecting said anode to said power means, means for connecting one of said loops to said cathode, means for connecting the other of said loops to said control grid, said cathode and grid being normally biased so that the output from said anode is the difference of inputs of said control loops, and means for unbalancing said throttle position responsive control loop independently of the position of said throttle whereby said predetermined throttle position is changed without unbalancing said pitch attitude responsive control loop.

5. In an automatic control system for a craft, power means for positioning the throttle of said craft, control means for said power means including two normally balanced signal chains and an amplifier for connecting said signal chains to said power means, one of said signal chains including means for developing a beam error signal corresponding to the displacement of the craft from a predetermined beam, the second of said signal chains including a pair of signal devices, one of said signal devices being operated in response to displacement of said throttle from normal position to develop a corresponding follow up signal, the other of said signal devices being manually operable for developing a corresponding adjustment signal, said follow up and adjustment signals being connected in opposed relation whereby operation of said last named signal device changes the normal position of said throttle when said second signal chain is balanced and said beam error signal operates said power means to position said throttle with respect to its changed position.

References Cited in the file of this patent

UNITED STATES PATENTS

| | | |
|---|---|---|
| 2,496,294 | Kellogg | Feb. 7, 1950 |
| 2,592,173 | Noxon | Apr. 8, 1952 |
| 2,652,896 | Chudyk et al. | Sept. 22, 1953 |
| 2,766,953 | Cummings | Oct. 16, 1956 |